United States Patent [19]
Bigham

[11] 3,879,916
[45] Apr. 29, 1975

[54] FATIGUE RESISTANT SPANWISE SPLICE

[75] Inventor: Carroll R. Bigham, Dunwoody, Ga.

[73] Assignee: The United States of America as represented by the Secretary of the Air Force, Washington, D.C.

[22] Filed: July 22, 1974

[21] Appl. No.: 490,599

[52] U.S. Cl. .................................. 52/758 D; 52/584
[51] Int. Cl. .............................................. F16b 5/06
[58] Field of Search .......... 52/758 D, 758 C, 758 F, 52/753 T, 753 C, 582, 584

[56] References Cited
UNITED STATES PATENTS

| | | | |
|---|---|---|---|
| 404,561 | 6/1889 | Reynolds | 52/758 D |
| 2,363,358 | 11/1944 | Punte | 52/758 D X |
| 2,595,703 | 5/1952 | Price | 52/758 D X |
| 2,889,019 | 6/1959 | Moore | 52/753 J |
| 3,423,896 | 1/1969 | Widerby | 52/584 |
| 3,432,196 | 3/1969 | Marchiorello | 52/758 D |
| 3,480,312 | 11/1969 | Meredith | 52/584 X |
| 3,535,842 | 10/1970 | Karn | 52/584 X |
| 3,632,149 | 1/1972 | Konig | 52/758 D |

*Primary Examiner*—Werner H. Schroeder
*Assistant Examiner*—Wayne L. Shedd
*Attorney, Agent, or Firm*—Jacob N. Erlich

[57] ABSTRACT

A method and apparatus for joining a pair of wing panels or the like by a spanwise splice. The splice is made up of a pair of splice plates, each being of a predetermined configuration so as to engagingly mate with a corresponding configuration on the panels. The panels are so positioned so that their ends are juxtaposed leaving a gap therebetween. A suitable fastener is located within the gap and fixedly secures the splice plates together thereby forming an extremely strong and reliable means of securely attaching a pair of members together.

7 Claims, 4 Drawing Figures

FATIGUE RESISTANT SPANWISE SPLICE

BACKGROUND OF THE INVENTION

This invention relates generally to splices for wing cover panels, and, more particularly, to a method and apparatus for producing fatigue resistant, fail safe, grooves/bonded spanwise splices.

In an aircraft, the wing structure is made up of the combination of outside fairing panels that provide the aerodynamic lifting surfaces and the inside supporting members that transmit the lifting force to the fuselage. The structure of a wing is an integration of the environment external to the vehicle wing, the aerodynamic shape of the wing, and the proposed use of the vehicle. The interaction of these three aspects of design leads to the selection of material, to the general structural layout, and, finally, to the detail choice of structural shapes, material thickness, joints and attachments. The result is a structural framework covered with a metal skin that also contributes to the load-carrying function.

Wing structure has evolved from the early use of wood, doped canvas and wire. The first general change was the replacement of wood with metal frameworks: wood and canvas structure is still found, however, in lightweight personal aircraft. Doped canvas was replaced by light metal skins, which served only as fairing in the beginning but which were later designed to provide a portion of the structural strength. Today, aluminum alloy outer skins are prime structural elements on all commercial transports and on the great majority of military craft.

An airframe wing is essentially two cantilever beams joined together. Each wing tip is the free end of the cantilever, and the center line of the vehicle represents the plane where the two fixed ends of the cantilevers are joined. The prime load-carrying portion of these cantilevers is a box beam made up usually of two or more vertical webs, plus a major portion of the upper and lower skins of the wing, which serve as chords of the beam. This box section also provides torsional strength and rigidity. Normally the prime box is designed to carry all the primary structural loads: these include all beam shears and bending moments, all drag shears and bending moments, and the torsional or twisting loads.

Leading and trailing edge portions of the wing, forward and aft of the prime box respectively, help to provide the airfoil shape required. These portions are designed to minimize their participation in the major load-carrying function. Where participation is forced by the detail design, the fasteners and materials reflect this, but normally the prime box strength is not reduced.

Conventionally, it is a practice to form joints in the wing skin by riveting two adjacent plates to an underlying splice plate or strap. In such a joint the load carried by one piece of skin is transmitted through a first set of rivets to the splice plate, through the splice plate to the second set of rivets, and thence into the second piece of skin. Such a joint, if designed to safely carry the compressive loads, may be greatly overstrength as regards the lesser tensile loads, and thus inefficient from a weight and cost standpoint.

Another limiting factor in the use of mechanical fasteners for spanwise joining of wing cover panels is the penetration of cover material with fastener holes. Such a procedure causes stress concentrations within the material which must be accounted for in the design by a reduction of allowable operating stress. In addition, it is a costly joining method. If these stress concentrations could be eliminated or significantly reduced while at the same time reducing cost by reducing the number of fasteners, the potential for fatigue, weight and cost improvements would be greatly enhanced.

SUMMARY OF THE INVENTION

The instant invention provides a fatigue resistant spanwise splice which overcomes the problems set forth hereinabove by transferring longitudinal and transverse loads without the use of holes in the basic wing structure.

The splice of this invention is a highly reliable and efficient means for joining two wing skins by spanwise splicing to provide a fatigue resistant, fail safe joint. The structure includes upper and lower splice plates, each having a sine-like wavy or undulating tenon-like extension which engages a corresponding mortise-like groove in the surface of the skin. The two splice plates are of a material less subject to fatigue failure than the basic skin material and are adhesively bonded to the skins at the faying surfaces. The two skin edges do not touch but are juxtaposed with a gap therebetween sufficiently wide to receive a plurality of aligned mechanical type fasteners which pass through and join the two splice plates. Since there are no fastener holes through the wing skins that would provide stress concentration areas conducive to development of fatigue cracks, the chance of fatigue failure in the joint would be substantially lessened. Should failure of the bond occur, loads would be transferred from the skins to the plates by bearing at all faying surfaces normal to the load.

It is therefore an object of this invention to provide a spanwise splice which requires no fastener penetration of the spliced members, and, therefore insures long fatigue life of the splice.

It is another object of this invention to provide a spanwise splice which provides a fail safe mechanical joint in the event of bond failure.

It is still another object of this invention to provide a spanwise splice which is economical to produce, extremely durable, and which utilizes conventional currently available components that lend themselves to standard mass producing manufacturing techniques.

For a better understanding of the present invention together with other and further objects thereof reference is made to the following description taken in connection with the accompanying drawing and its scope will be pointed out in the appended claims.

DETAILED DESCRIPTION OF THE PREFERRED EMBODIMENTS

Figure 1:
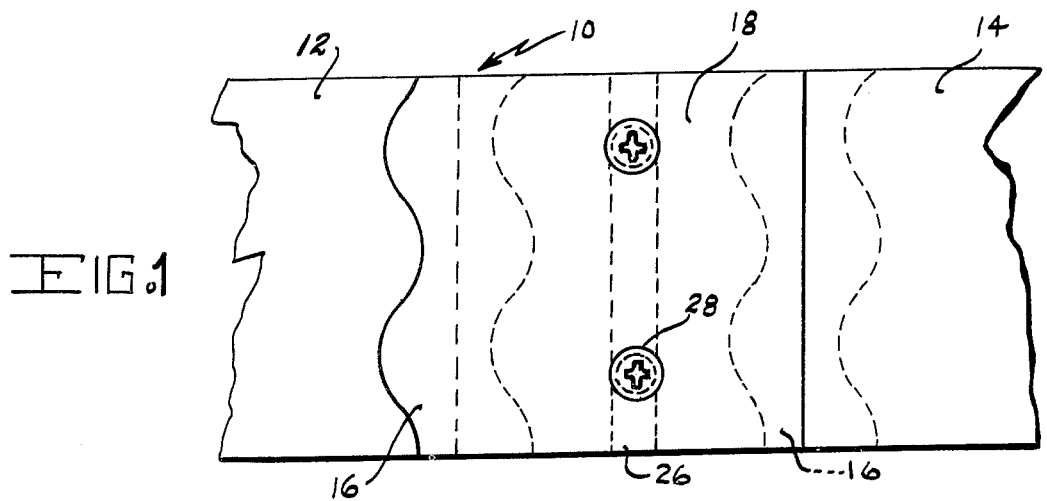
FIG. 1 is a plan view showing the spanwise splice of this invention securely joining a pair of members.
Figure 2:
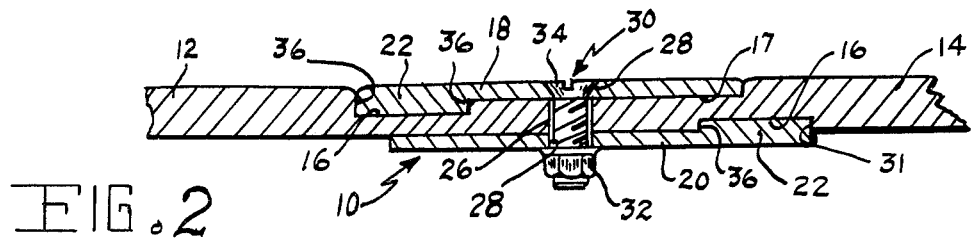
FIG. 2 is a side elevational view, shown partly in cross-section, of the spanwise splice of this invention securely joining a pair of members.

Reference is now made to FIGS. 1 and 2 of the drawing which best show the spanwise splice 10 which makes up the instant invention. Splice 10 finds its main utility in the joining together of the outer skin or panels 12 and 14 of a wing structure. It should be noted, however, that splice 10 may also be used in any environment in which the securing of a pair of members such as panels 12 or 14 is desirable.

When it becomes necessary to secure a pair of members such as panels 12 and 14 together, it is first necessary to form on one surface of each panel 12 and 14 a groove 16 therein. In addition, if desired, a land 17 may be formed opposite groove 16 as shown on panel 14 in FIG. 2. Grooves 16 are best formed of a sign wave configuration (as shown in FIG. 1) so as to matingly engage with a pair of splice plates 18 and 20, respectively, in a manner to be described in detail hereinbelow.

Splice plates 18 and 20 are of identical construction being formed of an elongated piece of material having an outstanding element 22 at one end thereof. Outstanding element 22 is formed in a sign wave configuration so as to mate with the sign wave groove 16 on panels 12 and 14, respectively. The material which makes up plates 18 and 20 is preferably of high strength and fatigue resistance, such as titanium, however, the main requirement of the material is that it have material properties equal to or better than the material which makes up panels 12 and 14.

When the splicing operation is to take place, panels 12 and 14 are placed in juxtaposition to each other leaving a space or gap 26 therebetween. In addition to this requirement grooves 16 of panels 12 and 14, respectively, are facing in a direction opposite to one another. Once in the position as shown in FIG. 2, plates 18 and 20 are positioned in such a relationship with respect to panels 12 and 14 so that the outstanding elements 22 located thereon engage grooves 16. In addition to outstanding elements 22, plates 18 and 20, each have a plurality of apertures 28 formed therein overlying and aligned with gap 26 formed between panels 12 and 14. Any suitable fastener 30 having nut 32 and bolt 34 securely holds splice plates 18 and 20 securely in position. For additional strength of splice 10, outstanding elements 22 may be bonded by any suitable securing means such as welding or adhesives within grooves 16 of panels 12 and 14, respectively.

Since the fastener holes 28 in splice plates 18 and 20 are unloaded holes, the resultant stress concentration is in the order of 3.0. In addition since no fastener penetration of panels 12 and 14 takes place, the fatigue life of the panels is greatly increased. Mechanical fail safe load capability in the case of bond failure is provided through the engagement of the plates 18 and 20 in grooves 16 which in turn transmit panel-to-panel shear forces through the fasteners 30 in the plates. In addition, chordwise tension is transferred by the matching lips 36 on panels 12 and 14 and splice plates 18 and 20, respectively.

Figure 3:
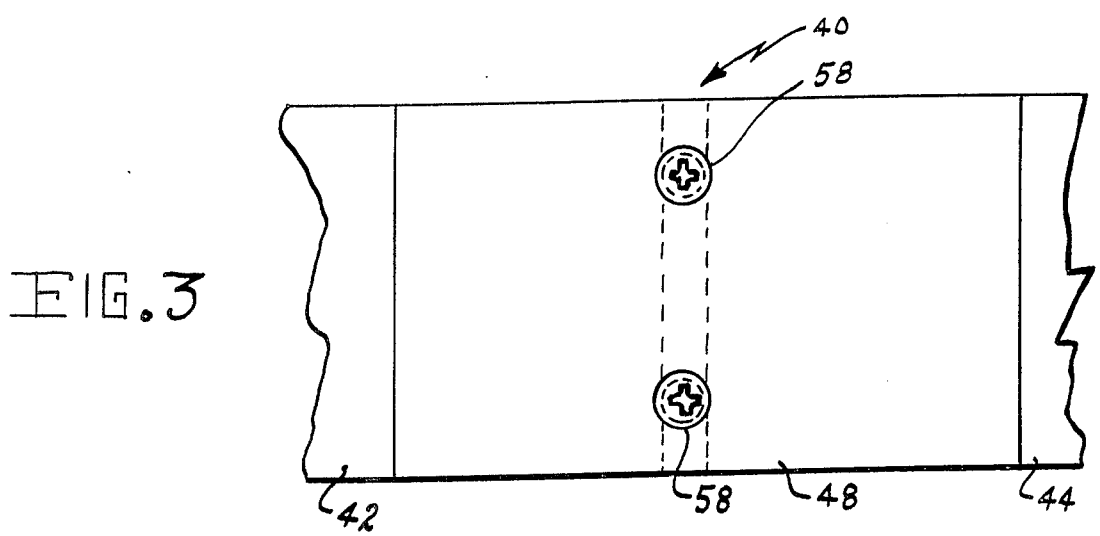
FIG. 3 is a plan view showing a modified spanwise splice of this invention securely joining a pair of members.
Figure 4:
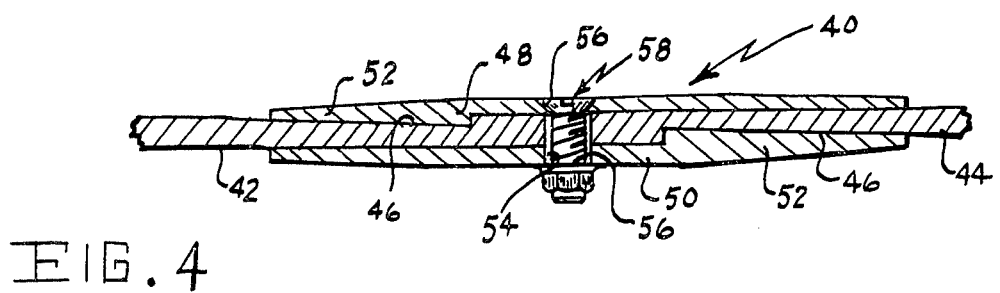
FIG. 4 is a side elevational view, shown partly in cross-section, of the modified splice shown in FIG. 3.

Reference is now made to FIGS. 3 and 4 of the drawing which show the modified spanwise splice 40 making up this invention. In the assembly of splice 40 there is formed on one surface of each panel 42 and 44 a tapered groove or land 46 so designed to matingly engage with a pair of splice plates 48 and 50, respectively, in a manner to be described hereinbelow.

Splice plates 48 and 50 are of identical construction being in the form of an elongated piece of material having an outstanding element 52 at one end thereof. This outstanding element 52 is so configurated to engage with land 46 on panels 42 and 44 when in position thereagainst. As with splice 10 as shown in FIGS. 1 and 2, the material which makes up plates 48 and 50 is preferably a high strength, fatigue resistant material such as titanium with the strength thereof being greater than the strength of the panels 42 and 44.

The remaining assembly operation is identical to the assembly of splice 10 in which the land portions 46 on panels 42 and 44 face in a direction opposite to each other. In position the ends of panels 42 and 44 leave a space or gap 54 therebetween and splice plates 48 and 50 matingly engage the respective land 46 on each panel. A plurality of apertures 56 are located in each splice plate 48 and 50, being in alignment with gap 54. Any suitable fastener 58 may be located within apertures 56 to securely hold the splice plates 48 and 50 in position. Again, additional strength in splice 40 may be obtained by bonding the outstanding elements 52 within the lands 46. The arrangement shows in FIGS. 3 and 4 of the drawing although lacking the provisions for shear transfer as provided in splice 10, is simpler to make up and requires less precision construction than the spanwise groove configurated splice 10.

Although this invention has been described with reference to particular embodiments it will be understood to those skilled in the art that this invention is also capable of a variety of alternate embodiments within the spirit and scope of the appended claims:

I claim:

1. In a splice for fastening a pair of panel members in fixed relationship with respect to one another, the improvement therein comprising the position of said members being such that one edge of each of said members is located juxtaposed the other and a predetermined amount of space is left between said edges, each of said members having a groove on only one surface thereof, said groove on one of said members facing in a direction opposite said groove on said other member, a pair of elongated plates, one of said plates engaging said groove on one of said members, the other of said plates engaging said groove in the other of said members and means located within said space between said members operably connected to said pair of plates for fixedly securing said plates together thereby fixedly securing said members together.

2. In a splice as defined in claim 1 wherein each of said plates has an outstanding element thereon for engaging a respective groove in said members.

3. In a splice as defined in claim 2 wherein at least one of said grooves and at least one of said outstanding elements are of a predetermined design.

4. In a splice as defined in claim 3 wherein said predetermined design is of a sine-wave configuration.

5. In a splice as defined in claim 3 wherein said predetermined design is of a tapered configuration.

6. In a splice as defined in claim 4 wherein said plates are bonded to said members at preselected locations.

7. In a splice as defined in claim 6 wherein said plates are made of a material having a greater strength than the material said members are constructed of.

* * * * *